United States Patent [19]
Peiser et al.

[11] 3,819,511
[45] June 25, 1974

[54] DISTILLING A CRUDE OIL

[75] Inventors: Alfred M. Peiser, Rocky Hill; Matthew J. DePasquale, Yardley, both of Pa.

[73] Assignee: Mobil Oil Corporation, New York, N.Y.

[22] Filed: Mar. 12, 1973

[21] Appl. No.: 340,498

[52] U.S. Cl.............. 208/353, 196/99, 196/134, 208/358
[51] Int. Cl............................................ C10g 7/00
[58] Field of Search ...... 208/353, 355, 358; 196/99, 196/134

[56] References Cited
UNITED STATES PATENTS

| | | | |
|---|---|---|---|
| 2,081,855 | 5/1937 | Fellows | 208/353 |
| 2,252,020 | 8/1941 | Mendius | 208/353 |
| 2,426,110 | 8/1947 | McCorquodale et al. | 208/353 |
| 3,310,487 | 3/1967 | Johnson et al. | 208/355 |
| 3,536,610 | 10/1970 | Stork | 208/358 |

Primary Examiner—Herbert Levine
Attorney, Agent, or Firm—Andrew L. Gaboriault; Carl D. Farnsworth

[57] ABSTRACT

An improved fractionating tower design with means for preheating the feed passed thereto is described which relies upon the concept of operating the tower primarily in a liquid loaded condition and particularly avoiding over-vaporization of any selected fraction withdrawn from the tower for a product stream. In conjunction therewith preheating of the feed is kept to a minimum and the preheated feed is introduced to an upper portion of the tower wherein it will best promote the above identified operating concepts. Vaporous product fractions are separated from the tower and recovered in adjacent rectifying zones.

9 Claims, 8 Drawing Figures

FIGURE 3
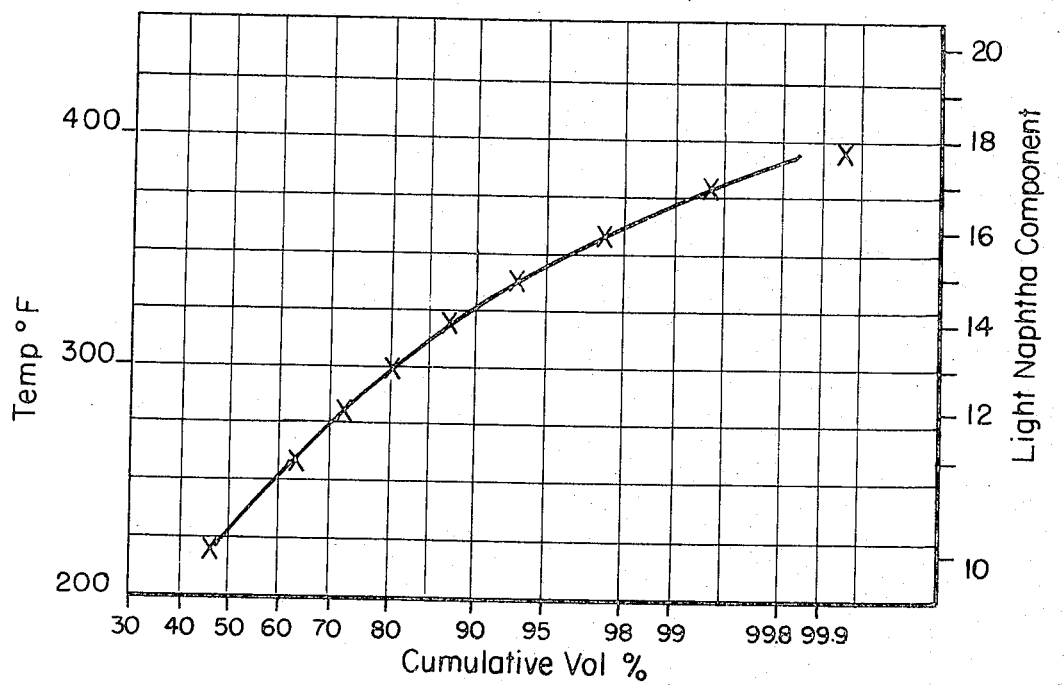
Comparative Distillation Curves-Light Naphtha
(X – New Tower, Solid Line – Std Tower)
FIGURE 4 Comparative Distillation Curves-Heavy Naphtha
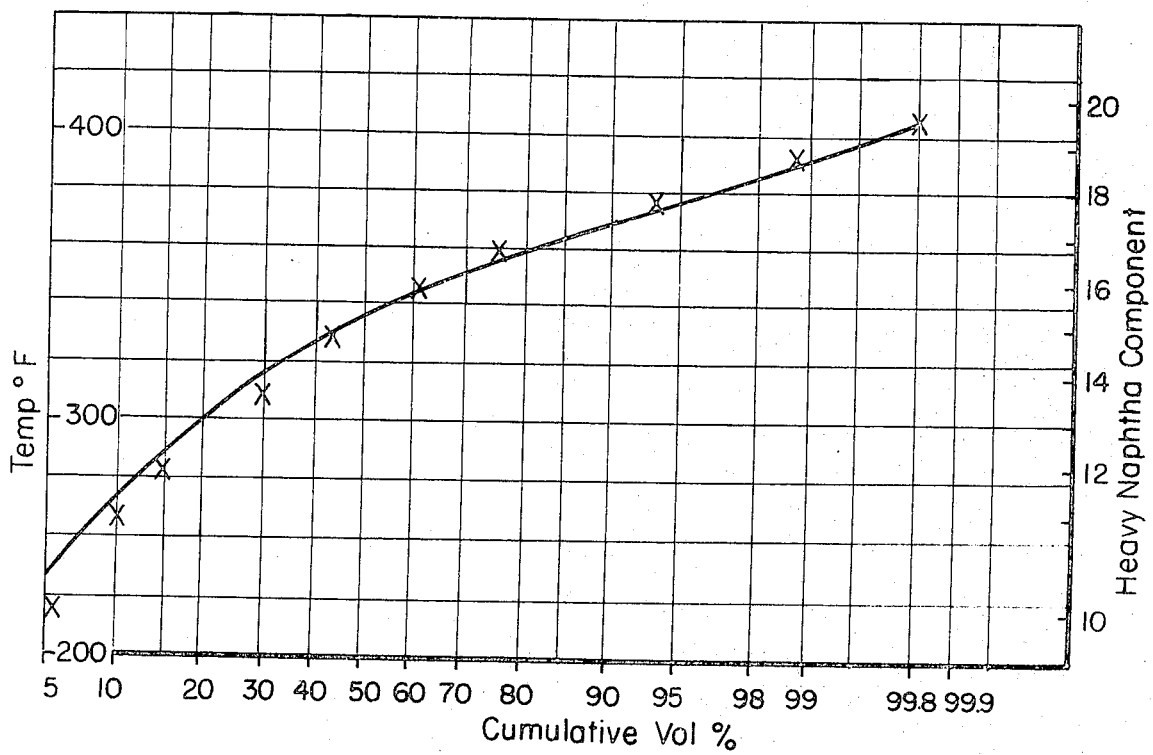
(X – New Tower, Solid Line – Std Tower)

Comparative Distillation Curves - Kerosene
(X - New Tower, Solid Line - Std Tower)

Comparative Distillation Curves – Light Gas Oil
( X – New Tower, Solid Line – Std Tower )

FIGURE 7 Comparative Distillation Curves - Heavy Gas Oil (X-New Tower, Solid Line-Std Tower)

Comparative Distillation Curves - Bottoms (BTM)

(X - New Tower, Solid Line - Std Tower)

DISTILLING A CRUDE OIL

BACKGROUND OF THE INVENTION

Countercurrent liquid-vapor fractionation such as used in distillation and absorption columns is a separational device used most frequently in the petroleum and chemical industry. The initial investment in fractionating columns alone, exclusive or large auxiliary equipment and piping, represents one of the largest single items of plant costs and thus it is desirable to keep the cost of fractionating columns to a minimum. On the other hand, the fractionating column must be able to make required separations efficiently and economically.

Crude fractionating and distilling operations are commonly carried out in vertically dispersed towers provided with baffled contact sections. The charge stream to the tower is usually introduced in a heated condition with additional heat provided to the tower by means of steam at the lower end of the tower. Heat carried up through the tower by rising vapor gives up heat to a descending liquid stream in direct countercurrent contact therewith. Various desired sidecuts or product streams may be withdrawn from the tower at different levels in either a vapor or liquid phase condition. Heat supplied to the tower or fractionating column must be sufficiently high to cause vaporization of all the products that are collected above the vaporizing and heating sections and in general a somewhat greater amount of heat is required in order to vaporize a portion of the heavy materials to provide reflux streams to the tower. Without providing excessive vaporization heat to the feed in a conventional prior art distillation tower design the fractionation heat is not sufficient throughout the vertical height thereof and particularly in the lower portion of the fractionating column. Thus providing the excess heat required, necessarily reduces the overall efficiency of the operation. The present invention is concerned with reversing that trend and improving the overall operating efficiency particularly of an atmospheric distillation column. The concepts hereinafter described may also be applied to columns operating at a pressure above and below atmospheric pressure.

SUMMARY OF THE INVENTION

It is an object of the invention herein described to provide an improved atmospheric distillation tower design and method of operation wherein the total heat requirements of the multiple distillation operation is substantially reduced when compared with the more conventional prior art methods of atmospheric distillation tower operation. A further object of this invention is concerned with the design of apparatus comprising an atmospheric distillation column in combination with feed preheat and product fraction heat exchange associated therewith providing for a more efficient distillation column. Thus the present invention is concerned with a new method and apparatus for processing, for example, crude oil through an atmospheric crude distillation tower.

The concepts contributing to the improved method and apparatus of the present invention can best be described and explained by comparison thereof with a conventional prior art method of distilling a crude oil. In the conventional method the crude oil is preheated by heat exchange and furnace means in order to vaporize enough of the crude oil charge to produce substantially all the required products thereof except the residue obtained therefrom. The preheated crude, substantially vaporized, is then introduced to the crude tower near the bottom or lower portion thereof. As the heated crude vapors rise through the tower cooling occurs at selected increments or stages of the tower thus producing successively lighter liquids which are independently withdrawn as products of the fractionating tower. Excess liquid runback or over flash material joins the liquid portion of the introduced crude to form the crude tower bottoms. Steam is normally introduced to the bottom portion of the tower and in various product side stripper to remove light material from the heavier side product fraction.

In the method of the present invention a substantially different approach is taken to the design and operation of a fractionating tower. That is, a crude charge containing gasiform material and boiling up to about 1,200°F. is introduced near an upper intermediate portion of the tower or at a temperature zone of the tower selected from within the range of about 300°F. to about 450°F. and providing a vapor-liquid phase separation of the crude charge. The vapor phase moves upwardly through the tower rectification section for separation of light and heavy naphtha products. As the liquid portion moves downwardly through the multi-trayed tower it is progressively heated in selected stages which selectively produce heavier vapors comprising kerosene, light gas oil and heavy gas oil withdrawn as side streams from the main fractionating tower. Any excess vaporous material formed by the progressive heating and corresponding to an overflash of liquid in the prior art is usually of a relatively low order of magnitude and joins the vapor portion of the entering crude to form vapor fractions subsequently removed from the tower rectification section above the point of crude inlet. To facilitate the separation of desired products from the vaporous streams withdrawn from the tower, side rectifiers are provided and used to remove the heavier component of the vapor stream from the lighter desired products therein. The separated heavy component is then returned to the tower as a liquid stream. Thus every effort is made to avoid overheating of any liquid portion of the crude moving downwardly through the tower.

The tower design and method of operation as herein described offers several significant advantages over the conventional prior art method. That is, in the method of the present invention it is not necessary to heat the entire crude to a very high temperature in order to achieve an adequate vaporization for separating particularly the vapors into desired products. In fact it has been found that lowering the temperature of the crude inlet within the relatively specific limits above identified produced several significant operating advantages herein discussed. Furthermore, the method of the present invention relies upon only enough crude charge preheat to vaporize a portion of the crude charge removed overhead in the tower rectification section above the point of charge inlet. The tower design of the present invention serves as a combined rectification, distillation and selective liquid heating unit for the remainder of the crude charge withdrawn from the tower below the feed inlet. In addition each of these heating units or heat exchangers is heated either by a hotter product obtained from a lower portion of the tower or by a preheat furnace. It has been found that the tower design and method of operation of this invention is particularly enhanced by introducing a controlled or limited amount of steam to the lower portion of the tower. A further significant advantage in the method and tower design of this invention is identified with operating the fractionating tower preferably in a liquid loaded condition instead of a vapor loaded condition and this permits a tower design of considerably different configuration than required in the prior art.

BRIEF DESCRIPTION OF THE DRAWINGS

FIG. 3 is a comparative distillation curve for light naphtha obtained on the basis of the improved tower design and a standard tower.

FIG. 4 is a comparative distillation curve for heavy naphtha obtained on the basis of the improved tower design and a standard tower.

DISCUSSION OF SPECIFIC EMBODIMENTS

Figure 1:
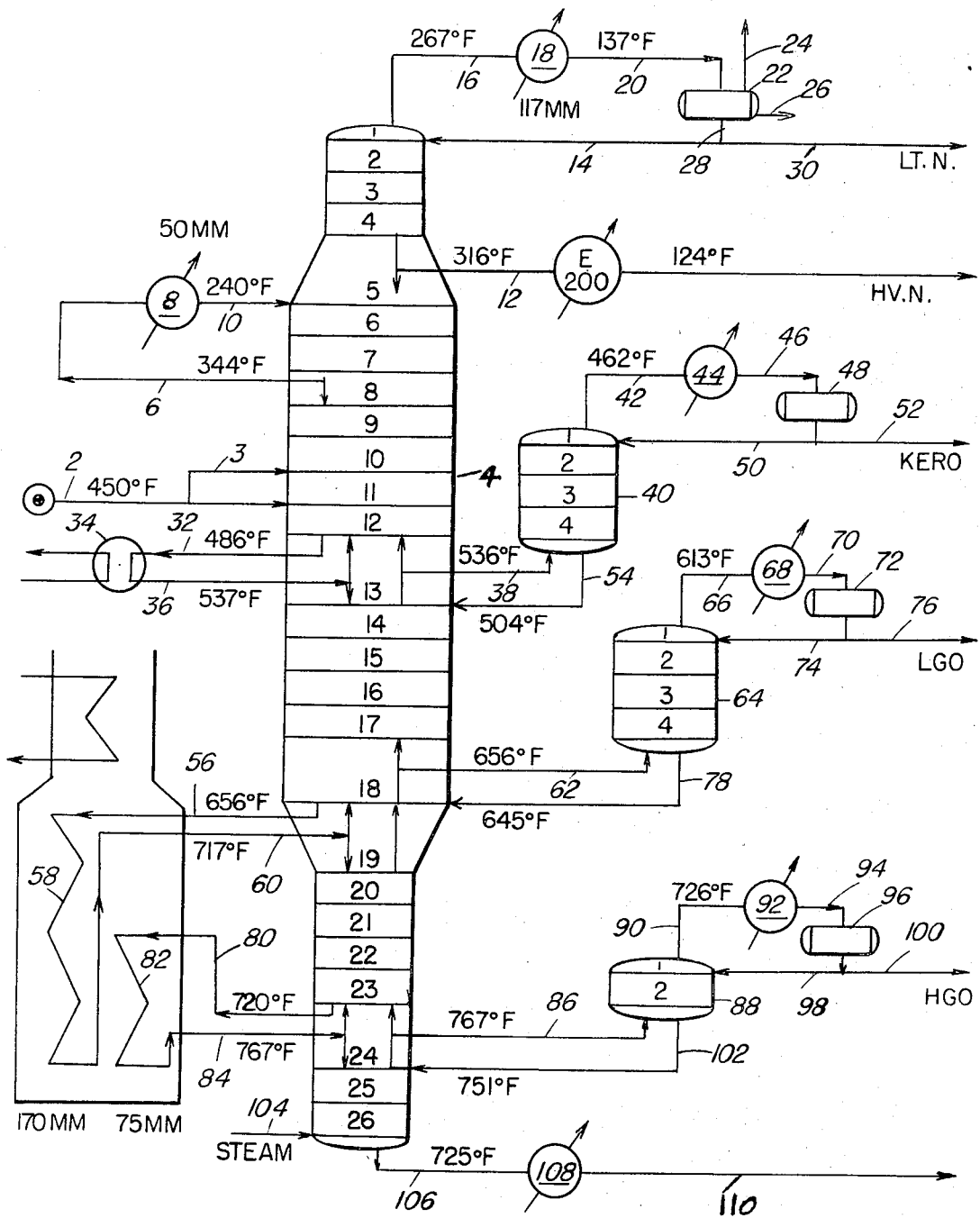
FIG. 1 is a diagrammatic illustration in elevation of a fractionating tower design encompassing the improved concepts of the invention.
Figure 2:
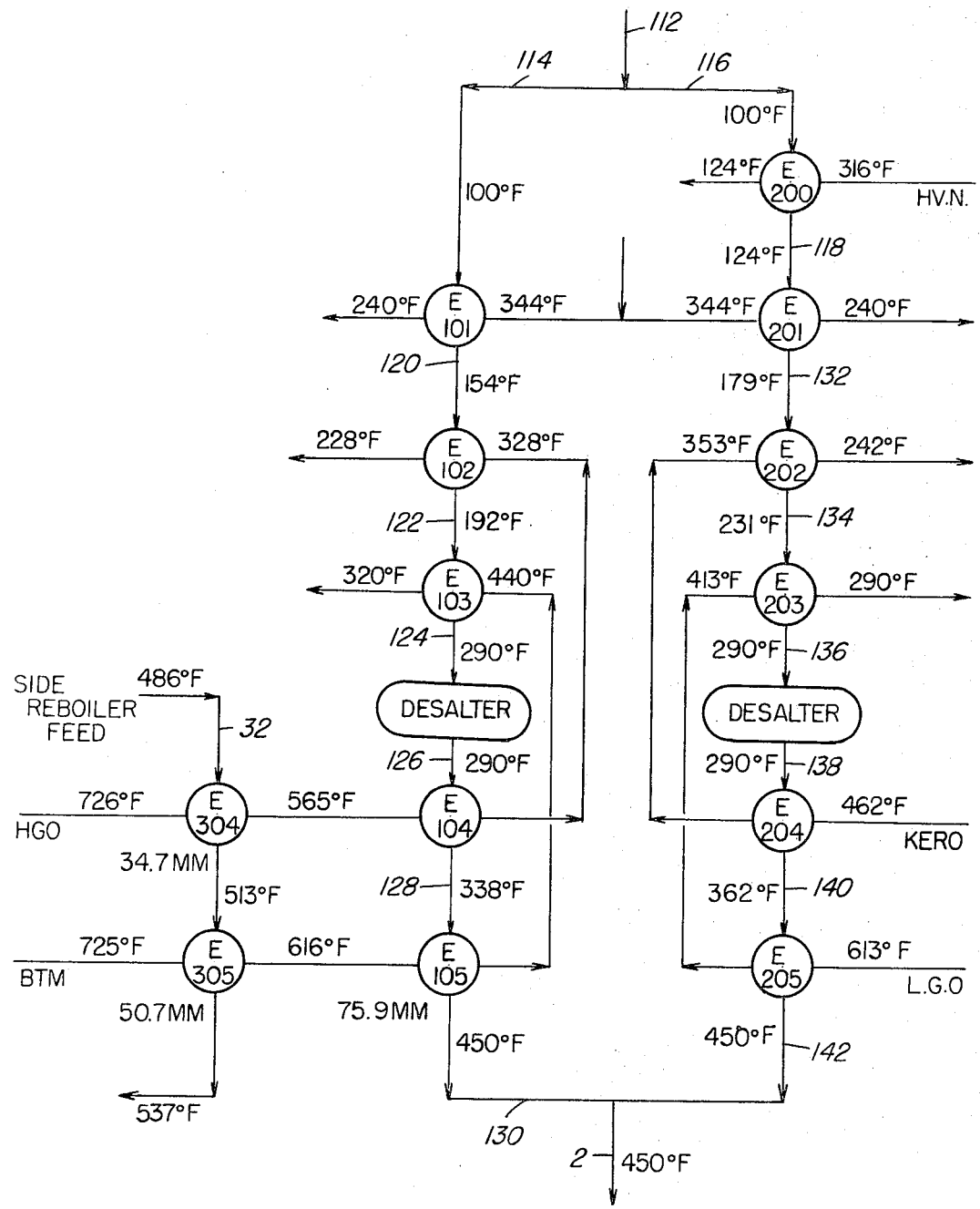
FIG. 2 is a diagrammatic illustration of a heat exchange system which may be used in conjunction with the tower arrangement of FIG. 1 to obtain desired heat exchange duty and preheat of the crude charged to the tower.
Figure 5:
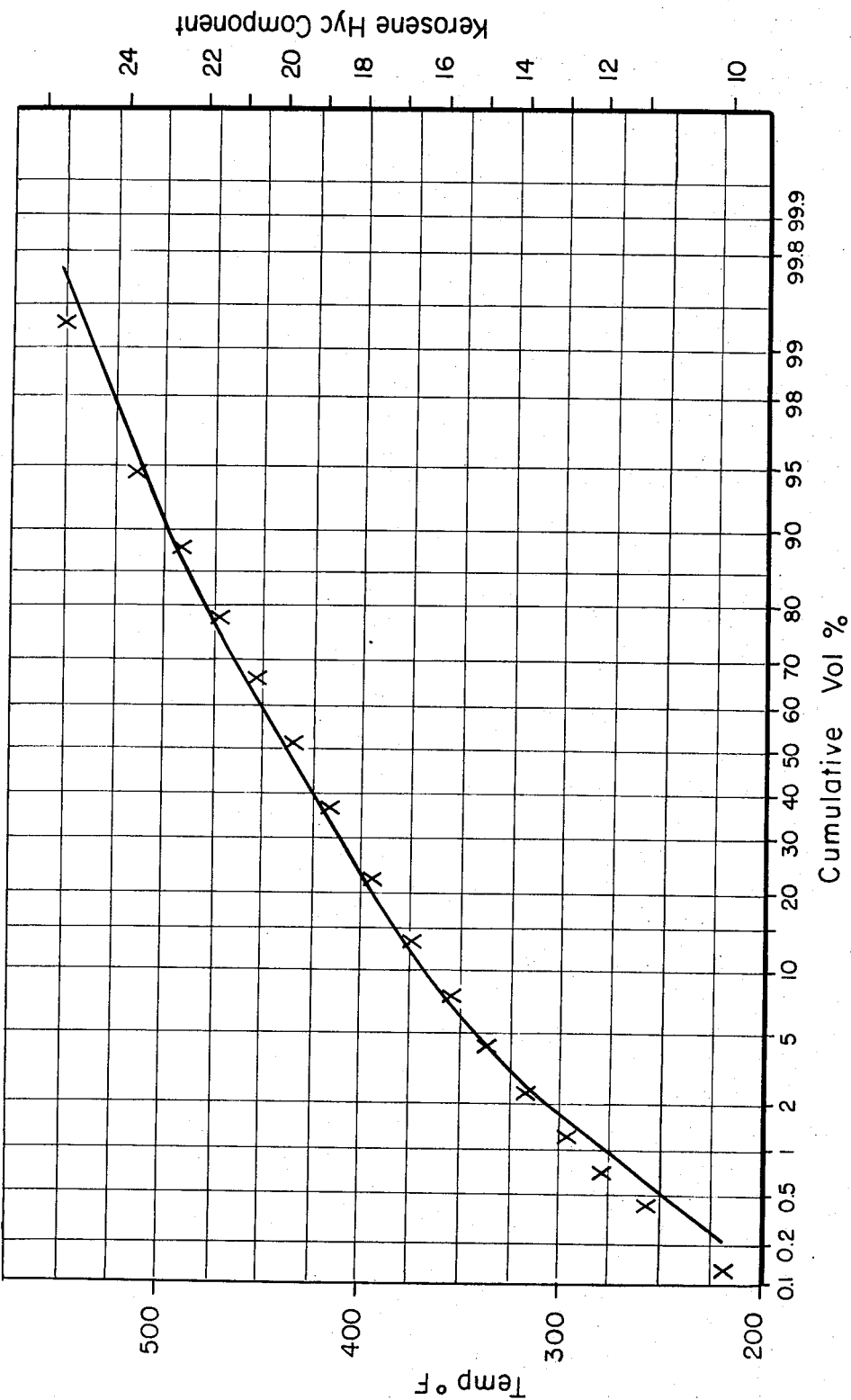
FIG. 5 is a comparative distillation curve for kerosene obtained on the basis of the improved tower design and a standard tower.
Figure 6:
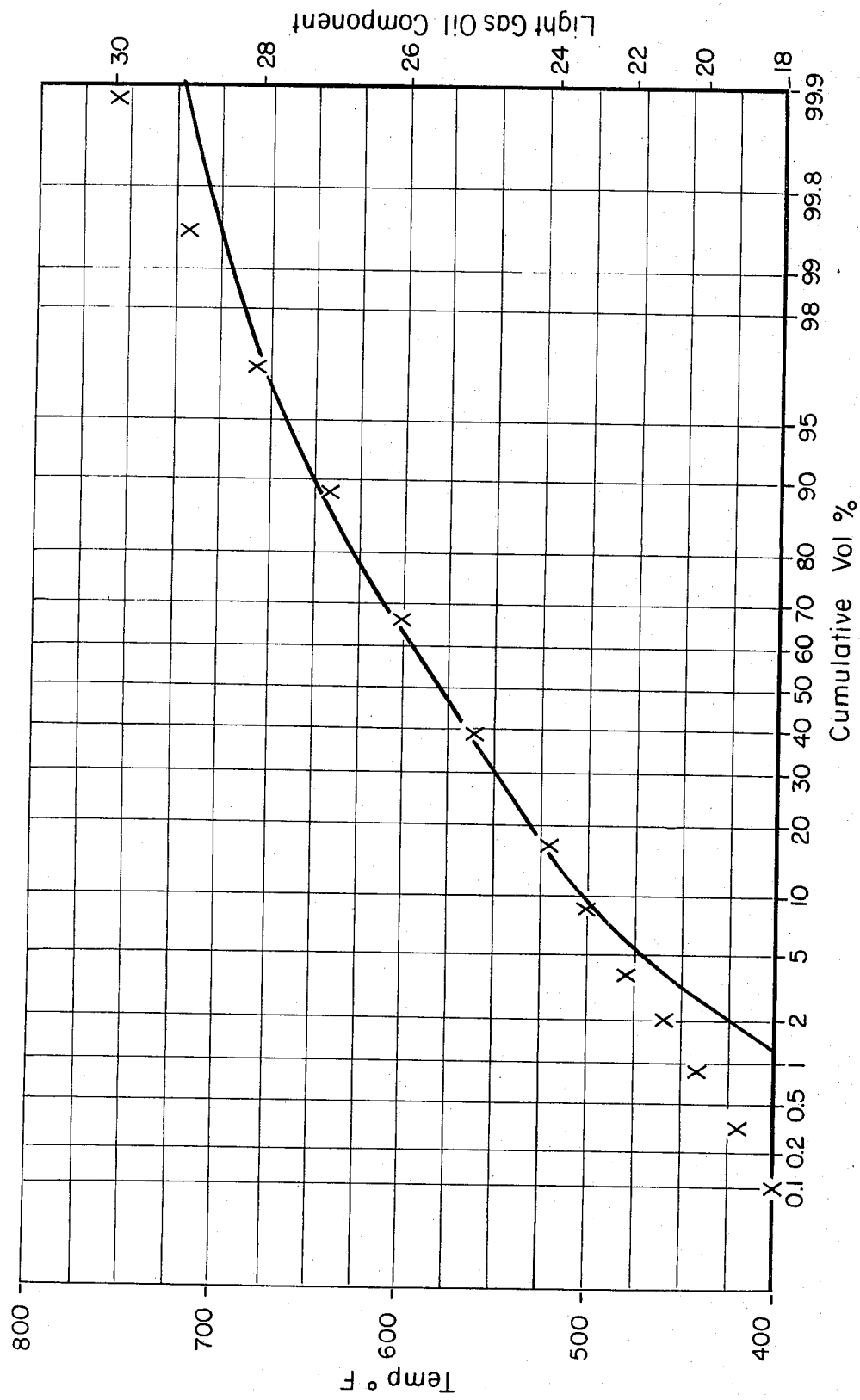
FIG. 6 is a comparative distillation curve for a light gas oil obtained on the basis of the improved tower design and a standard tower.
Figure 7:
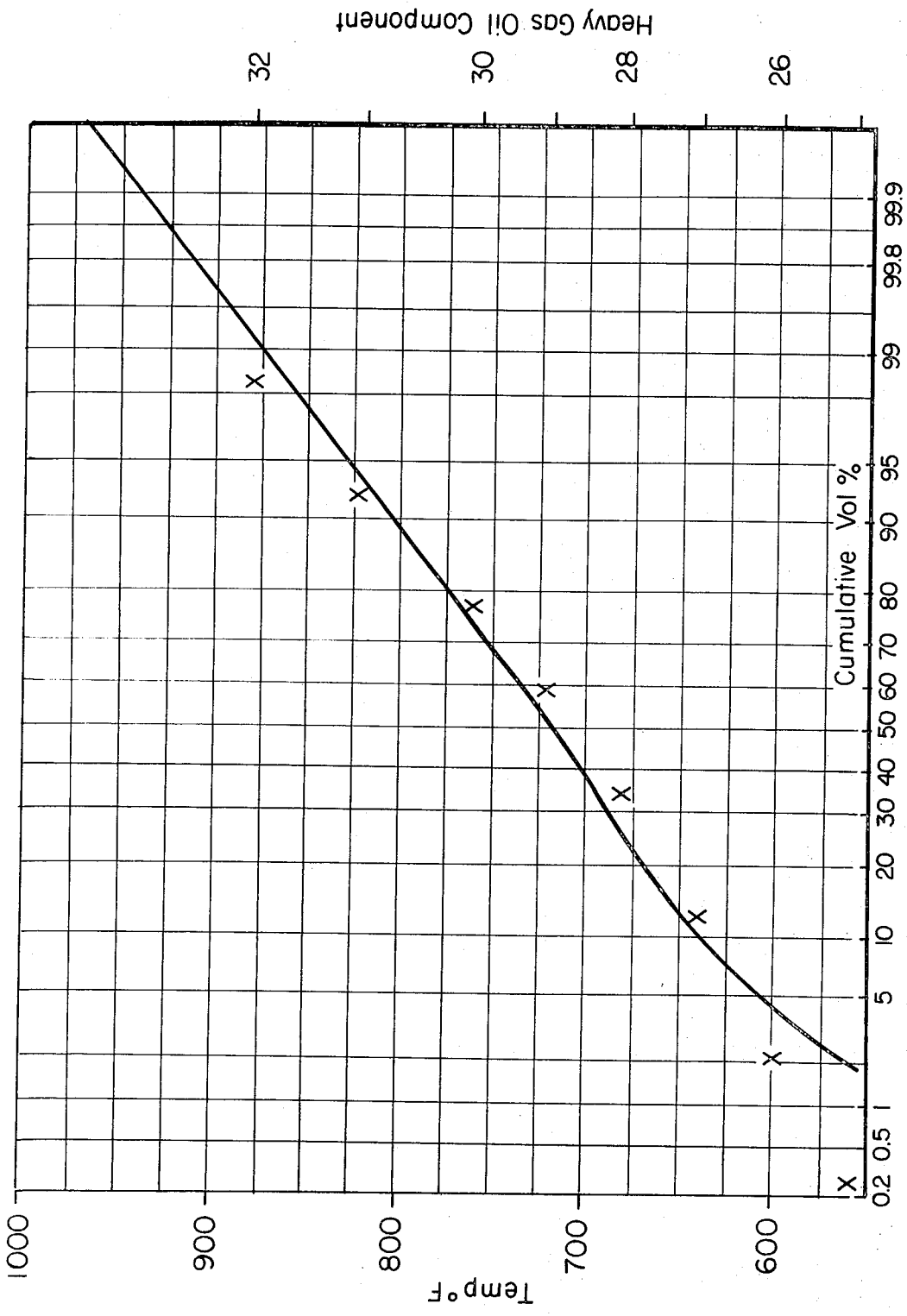
FIG. 7 is a comparative distillation curve for a heavy gas oil product obtained on the basis of the improved tower design and a standard tower.
Figure 8:
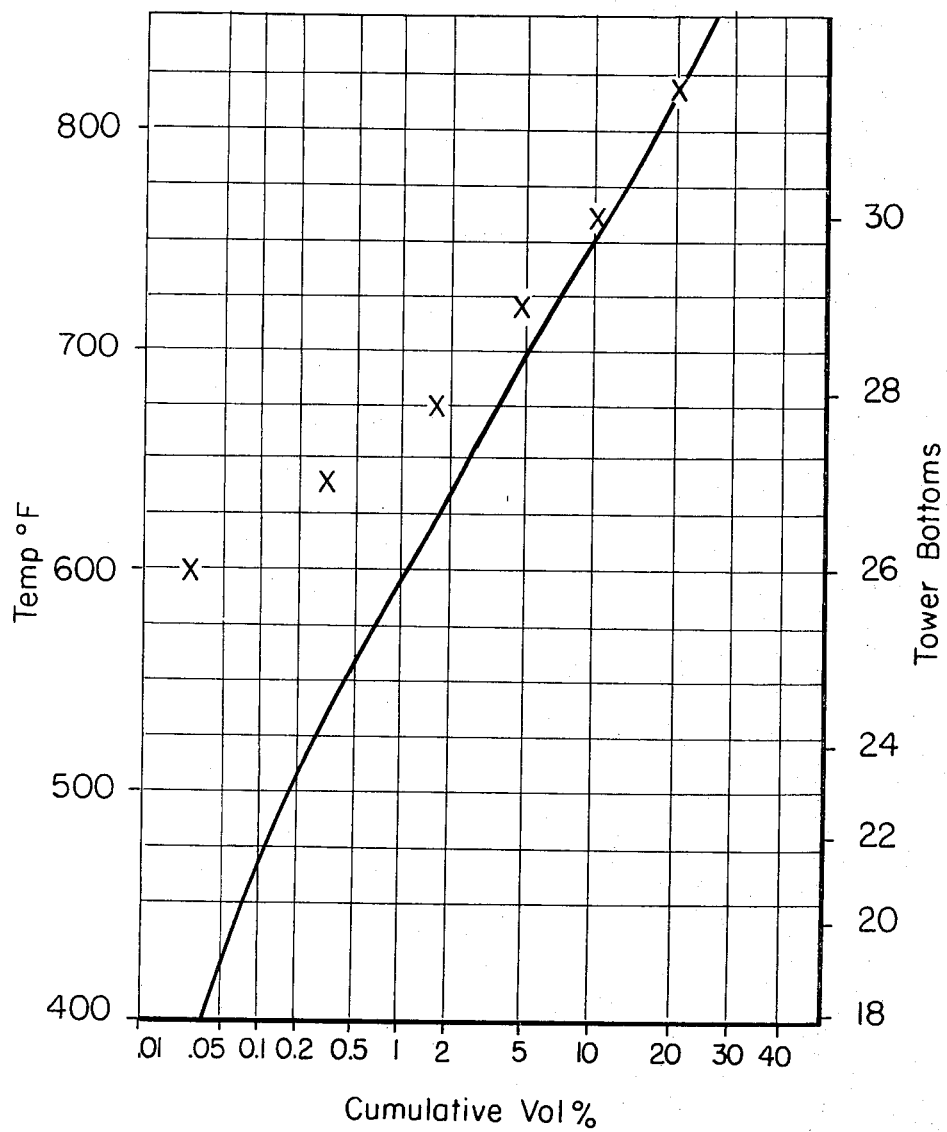
FIG. 8 is a comparative distillation curve of the tower bottoms obtained by the improved tower and a standard tower.

Referring now to FIG. 1 there is shown by way of example the schematic new fractionating tower design of the present invention wherein the introduction and withdrawal point of the various fractions is identified on the basis of temperature of liquid or vapor sections rather than a particular tray location. Thus in the diagrammatic arrangement of FIG. 1, the crude oil charge boiling up to about 1,200°F., preheated to a temperature of about 450°F. as more fully explained with respect to FIG. 2, is introduced by conduit 2 provided with branch conduit 3 to a fractionating tower 4. The fractionating tower is provided with a plurality of fractionating plates of the bubble or valve type or other types known and used by the industry. The vaporous portion of the crude charged to the tower is caused to move upwardly through the tower rectification section to a zone or region where the temperature is approximately 344°F. At this point, liquid material collected on a tray is withdrawn from the tower as by conduit 6, passed through heat exchange equipment or cooler 8 to reduce the temperature of the withdrawn liquid to about 240°F. before return to an upper portion of the tower by conduit 10. This pump around (PA) arrangement represented by conduits 6 and 10 with cooler 8 corresponds to the pump around arrangement of FIG. 2 embodying heat exchangers E101 and E201 more fully discussed below. A heavy naphtha is withdrawn as a liquid fraction from tower 4 by conduit 12 at a temperature of about 316°F. passed through a heat exchanger corresponding to exchanger E200 of FIG. 2 wherein the temperature of the heavy naphtha is reduced to about 124°F. Vaporous material passing upwardly through the remaining portion of tower 4 is caused to flow counter-current to reflux material introduced to an upper portion of the tower at a temperature of about 137°F. by conduit 14. The amount of reflux employed is sufficient to maintain a top tower temperature of about 267°F. from which vaporous material is withdrawn by conduit 16. The vaporous material in conduit 16 is passed through heat exchanger or cooler 18 to reduce the temperature of the vapors to about 137°F. before passage by conduit 20 to accumulator or knock-out drum 22 maintained at a temperature of about 137°F. Uncondensed gases are removed from drum 22 by conduit 24, water is removed from drum 22 by conduit 26 and condensed hydrocarbons comprising light naphtha are removed by conduit 28 and 30. Condensed light naphtha is recycled as reflux by conduit 14 to the tower 4.

The liquid portion of the crude charge boiling above about 450°F. and introduced by conduit 2 is caused to flow downwardly through the tower under the conditions hereinafter defined, so that the portion of the tower beneath the feed inlet is primarily liquid loaded rather than vapor loaded as practiced in the prior art. Thus, in the portion of the tower providing liquid at a temperature of about 486°F., liquid is withdrawn by conduit 32 and passed through suitable heat exchange means 34 wherein the temperature of the liquid is raised to about 537°F. before return to the tower by conduit 36 at a point beneath its withdrawal point thereby releasing hot vaporous and liquid material within the tower as diagrammatically shown. In the same general area a separate vaporous stream diagrammatically indicated by the vertical arrow at a temperature of about 536°F. is withdrawn by conduit 38 for passage to a side rectifier 40. In rectifier 40 vaporous material boiling up to about 462°F. and comprising primarily kerosene boiling range material is separated from higher boiling liquid material. The vaporous kerosene fraction is withdrawn from the upper portion of rectifier 40 by conduit 42, cooled in means represented by cooler 44 and then passed by conduit 46 to drum 48 maintained at a temperature sufficient to condense water in the kerosene stream. A portion of the recovered kerosene collected in drum 48 is recycled as reflux by conduit 50 to the rectifier with the remaining portion being withdrawn by conduit 52 as product. Liquid material separated in rectifier 40 is withdrawn from the bottom thereof by conduit 54 at a temperature of about 504°F. and returned to the tower 4 for separation.

In a lower portion of the tower providing liquid at a temperature of about 656°F., all of the remaining charge liquid is withdrawn by conduit 56, passed through a heat exchanger 58 provided in a suitable furnace means for example wherein the temperature of the liquid is raised to about 717°F. before return to the tower by conduit 60. Vaporous material thus formed is withdrawn by conduit 62 from the tower for the recovery of a light gas oil fraction.

The light gas oil product is obtained by withdrawing vapors diagrammatically shown by the vertical arrow therefrom boiling up to about 656°F. by conduit 62 for passage to rectifier 64 wherein a separation is made between hydrocarbons boiling up to 613°F. from higher boiling liquid material. The vaporous material separated in rectifier 64 is withdrawn by conduit 66 and cooled in means represented by cooler 68 to a temperature sufficient to condense water therefrom after passage by conduit 70 to collector drum 72. A portion of the collected light gas oil is recycled as reflux by conduit 74 to zone 64 with the remaining light gas oil (LGO) portion recovered by conduit 76 as product. Material higher boiling than about 613°F. and at a temperature of about 645°F. is returned from zone 64 by conduit 78 to the tower at a lower section than it originated from.

To provide additional heat to the lower portion of the tower, a liquid stream at a temperature of about 720°F. is withdrawn by conduit 80, passed through a suitable furnace means 82 to raise the temperature thereof to about 767°F. before return to the tower by conduit 84. Vaporous material thus formed is withdrawn from the tower by conduit 86 at a temperature of about 767°F. for introduction into rectifier zone 88 wherein a separation is made to recover heavy gas oil (HGO) from higher boiling material. Heavy gas oil vapor boiling up to about 726°F. is withdrawn from zone 88 by conduit 90, cooled in cooling means represented by cooler 92 and conveyed in condensable form by conduit 94 to drum 96. A portion of the condensed heavy gas oil is recycled to the rectifier by conduit 98 as reflux with the remaining portion withdrawn by conduit 100 as a product of the tower. Hydrocarbon material higher boiling and at a temperature of about 751°F. is withdrawn from zone 88 by conduit 102 and returned to fractionating tower 4. Steam is introduced to the bottom portion of the tower in limited amount by conduit 104. A bottoms residue at a temperature of about 725°F. is removed from the tower by conduit 106, cooled in cooling means 108 as required and withdrawn therefrom by conduit 110 for further use as desired.

In the tower arrangement of FIG. 1, the tower is shown separated into a number of stages, 1 through 26. These separations are theoretical stages of separation of the tower and do not intend to convey the number of trays employed in the tower.

FIG. 2 schematically presents a heat exchange arrangement or train which is used in conjunction with the tower design of FIG. 1 to obtain desired heat recovery and utilization promoting the economics of the tower operation herein described. Thus in the arrangement of FIG. 2 the crude charge is introduced to the process by conduit 112 and thereafter is separated into two substantially equal streams 114 and 116. In the left hand leg of the heat exchange train about 50 percent of crude charge at a temperature of about 100°F. is caused to pass sequentially through a series of heat exchange zones so as to raise the temperature of this portion of the crude up to about 450°F. for discharge by conduit 2 into the atmospheric fractionating tower discussed with respect to FIG. 1.

The crude charge in conduit 114 at a temperature of about 100°F. is passed to indirect heat exchanger E101 wherein it is indirectly heated to a temperature of about 154°F. by a pump around system generally represented by stream 6, exchanger 8 and conduit 10 of FIG. 1. The heated crude is then passed by conduit 120 to heat exchanger E102 wherein it is passed in indirect heat exchange with a heavy gas oil stream existing at a temperature of about 328°F. to cool the heavy gas oil to about 228°F. and raise the crude temperature up to about 192°F. The crude thus preheated is then passed by conduit 122 to heat exchanger E103 to which bottoms product at a temperature of 440°F. is passed. The crude thus heated to 290°F. is passed by conduit 124 to a desalting zone and thence by conduit 126 to heat exchanger E104. In heat exchanger E104, the desalted crude oil is passed in indirect heat exchange with the heavy gas oil fraction of FIG. 1 withdrawn as by conduit 90 to reduce the temperature thereof from 565°F. to about 328°F. before passage to heat exchanger E102 as above discussed. In exchanger E104 the crude oil is raised to a temperature of about 338°F. and passed therefrom by conduit 128 to exchanger E105 wherein heat exchange with bottoms product at about 616°F. is made. The bottoms reduced to a temperature of 440°F. is then passed to heat exchanger E103. Crude is withdrawn from exchanger E105 at a temperature of 450°F. for introduction by conduits 103 and 2 to the tower. The heavy gas oil and the bottoms product are subjected to heat exchange steps E304 and E305 corresponding to exchanger 34 of FIG. 1 to heat stream 32 discussed with respect to FIG. 1.

In the right-hand leg of the heat exchange train of FIG. 2, the remaining portion of the crude charge is passed by conduit 116 to heat exchanger E200 wherein its temperature is raised to about 124°F. by indirect heat exchange with heavy naphtha withdrawn as by conduit 12 at a temperature of 316°F. from tower 4 of FIG. 1. The partially heated crude is then passed by conduit 118 to heat exchanger E201 wherein it is indirectly heated to about 179°F. by pump around material withdrawn by conduit 6 of FIG. 1 at a temperature of about 344°F. The thus heated crude is then passed by conduit 132 to heat exchanger E202 wherein it is further heated by indirect heat exchange with a kerosene fraction at a temperature of about 353°F. obtained from rectifier 40 as by conduit 42. In heat exchanger E202, the crude temperature is raised to about 231°F. before passage by conduit 134 to heat exchanger E203. In heat exchanger E203 the crude is indirectly heated by a light gas oil fraction to about 290°F. The light gas oil fraction at a temperature of 413°F. used for this purpose is initially obtained from tower 4 and rectifier 64 by conduit 66. The crude oil preheated to about 290°F. in E203 is then passed by conduit 136 to a desalter. The desalted crude is passed by conduit 138 to indirect heat exchanger E204 wherein it is heated to about 362°F. by the kerosene fraction withdrawn by conduit 42 of FIG. 1 at a temperature of about 462°F. Thus it will be observed that the kerosene fraction is used in heat exchangers E204 and E202. The crude oil heated to about 362°F. in exchanger E204 then passes by conduit 140 to exchanger E205 wherein it is indirectly heated to about 450°F. by the light gas oil feed in conduit 66 removed from rectifier 64 of FIG. 1. Thus the light gas oil (LGO) overhead vapor at a temperature of about 613°F. is passed sequentially through heat exchangers E205 and E203. Cooler 44 of FIG. 1 corresponds to exchangers E204 and E202 of FIG. 2 and cooler 68 of FIG. 1 corresponds to exchanger E205 and E203 of FIG. 2. Also the kerosene stream separated from E202 must be subjected to a further cooling step in order to reduce it to a temperature sufficient to condense the product desired for passage to drum 48 of FIG. 1. Similarly the light gas oil stream withdrawn from E203 must be further cooled to a temperature sufficient to condense the product desired before introduction to drum 72 of FIG. 1. The crude charge heated as above described in the right-hand train is passed by conduit 142 to conduit 2 for introduction to tower 4 as discussed above.

In the investigation leading to the tower design and concepts of this invention it has been found quite unexpectedly that the overall operation is considerably improved by maintaining the crude charge temperature to the fractionating tower within a relatively limited range of about 300° to about 450°F. and the crude charge should be introduced to the tower section providing a comparable temperature condition. Of course as the temperature of the charge is reduced from 450°F. to about 300°F. the point of charge inlet to the tower will be changed as well as the heat exchange duty described with respect to FIG. 2. In addition it has been found quite unexpectedly when comparing the physical requirements of the tower and utility requirements as expressed in Table 1 below that when using the processing sequence and system of this invention, the tower size can be reduced accompanied by a reduction in utility costs and particularly fuel costs. Thus the method and system of the present invention promotes the conservation of energy and this is significantly important in reducing refining costs and particularly fuel inventories.

TABLE 1

Basis: 137M BBL/Day Crude Charge

|  | Old Design | New Design |
|---|---|---|
| MAIN TOWER | | |
| Diameter | 23.5 ft. | 20.5 ft. |
| Theoretical Stages | 25 | 26 |
| SIDE TOWERS | | |
| Diameter | 5.5 ft. | 10.5 ft. |
| Theoretical Stages | 6 | 10 |
| UTILITIES | | |
| Fuel | 350 MM | 245 MM |
| Steam | 34 M LBS./HR | 27 M LBS./HR |

Further significant improvements unexpectedly realized following the concepts of the present invention are particularly observable by reference to FIGS. 3 through 8 presented herewith with the greatest changes being observed in FIGS. 4 through 8. The figures are essentially self-explanetory since they are concerned with comparing the distillation curves of different product fractions obtained by a standard atmospheric tower design and that obtained by the new and improved design arrangement of the present invention. The solid line shown on the graphs represented in FIGS. 3 through 8 represents the distillation curve for the identified hydrocarbon component fraction obtained by a standard tower design with the "X" marks indicating that obtained by the new design. It will be observed when comparing the results obtained and presented in FIG. 3 that no essential difference is indicated in the two different product distillation curves obtained. However, beginning with FIG. 4, presenting the distillation curve for the heavy naphtha fraction, it will be observed that there are more light ends in the heavy naphtha fraction obtained by the new tower design concept. On the other hand, the kerosene fraction of FIG. 5 contains less light ends as do the light and heavy gas oil fractions of FIGS. 6 and 7. The bottoms fraction represented by FIG. 8 contains considerably less light ends.

Thus the new tower design of the present invention produces product fractions equal to or better than the standard design under more economic and efficient operating conditions as identified in Table 1 above.

Having thus provided a general discussion of the improved tower design of the present invention and discussed specific examples in support thereof, it is to be understood that no undue restrictions are to be imposed by reason thereof except as provided in the following claims.

We claim:

1. A method for distilling a crude oil for the recovery of component fraction thereof which comprises:
   a. heating a crude oil to a temperature within the range of 300°F. up to about 450°F.,
   b. introducing the heated crude oil into an elongated distillation zone in a temperature region thereof above the point of withdrawal of vaporous material providing a kerosene fraction,
   c. withdrawing light naphtha and lower boiling hydrocarbons from an upper portion of said distillation zone and effecting separation thereof into a light naphtha fraction, a water fraction and lower boiling gaseous hydrocarbon material,
   d. recycling light naphtha separated in step (c) as reflux to an upper portion of said distillation zone,
   e. withdrawing a heavy naphtha fraction from said distillation zone,
   f. removing heat from the distillation zone above the crude oil inlet by withdrawing liquid boiling above the heavy naphtha fraction and passing it in heat exchange with cooler material before return to an upper portion of said distillation zone,
   g. withdrawing a vaporous stream from said distillation zone condensable to kerosene boiling range material and recovering the thus withdrawn kerosene containing vaporous stream in a zone separate from said distillation zone from higher boiling condensate,
   h. withdrawing a vaporous stream from a lower portion of said distillation zone condensable to light gas oil and recovering the thus withdrawn light gas oil vaporous streams in a zone separate from said distillation zone under conditions to separate and recover light gas oil from higher boiling condensate,
   j. separately returning the higher boiling condensate of steps (g) and (h) to said distillation zone,
   k. withdrawing a liquid stream from said distillation zone beneath said crude oil inlet for heating to a higher temperature and return to said distillation zone adjacent the kerosene vapor withdrawal zone,
   l. withdrawing a second liquid stream from a section of said distillation zone below said light gas oil producing vapors for heating to a higher temperature and return to said distillation zone adjacent a heavy gas oil vapor withdrawal zone,
   m. introducing steam to a bottom portion of said distillation zone and
   n. withdrawing a bottoms product higher boiling than heavy gas oil from the bottom of the distillation zone.

2. The method of claim 1 wherein the vaporous material condensable to kerosene is cooled by indirect heat exchange with a portion of the crude oil passed to the distillation zone.

3. The method of claim 1 wherein the vaporous material condensable to light gas oil is cooled by indirect heat exchange with a portion of crude oil passed to the distillation zone.

4. The method of claim 1 wherein the liquid stream withdrawn in step (k) is heated to a higher temperature by heat exchange with heavy gas oil and bottoms product withdrawn from the distillation zone.

5. The method of claim 1 wherein liquid material withdrawn from a lower portion of said distillation zone is heated to a higher temperature in the radiation section of a furnace heating zone.

6. The method of claim 1 wherein the crude oil to be charged to the distillation zone is separated into two streams with one of the crude oil streams raised to a higher temperature by indirect heat exchange with heavy gas oil and the bottoms stream withdrawn from the distillation zone with the other crude oil stream heated to a higher temperature by indirect heat exchange with the vaporous material condensable to light gas oil and kerosene withdrawn from the distillation zone.

7. The method of claim 6 wherein desalting of the crude oil in each stream is accomplished intermediate stages of heat exchange when the crude has attained a desalting temperature.

8. The method of claim 6 wherein the separately heated streams of crude oil are recombined before entering the distillation zone.

9. The method of claim 6 wherein the purity of the product streams comprising kerosene, gas oil fractions and the bottoms is substantially improved.

* * * * *

PO-1050
(5/69)

UNITED STATES PATENT OFFICE
CERTIFICATE OF CORRECTION

Patent No. 3,819,511     Dated June 25, 1974

Inventor(s) ALFRED M. PEISER and MATTHEW J. DePASQUALE

It is certified that error appears in the above-identified patent and that said Letters Patent are hereby corrected as shown below:

Page 1, [75] "Inventors: Alfred M. Peiser, Rocky Hill;
Matthew J. DePasquale, Yardley,
both of Pa."

should read:

--Inventors: Alfred M. Peiser, Rocky Hill, N.J.;
Matthew J. DePasquale, Yardley,
Pa.--

Column 6, line 19 : "103" should read --130--

Signed and sealed this 22nd day of October 1974.

(SEAL)
Attest:

McCOY M. GIBSON JR.                C. MARSHALL DANN
Attesting Officer                Commissioner of Patents